United States Patent [19]

Sugiyama

[11] Patent Number: 5,303,212

[45] Date of Patent: Apr. 12, 1994

[54] LOW VOLTAGE, HIGH CURRENT MAGNETIC TRANSDUCER DRIVE SYSTEM FOR DIGITAL RECORDING

[75] Inventor: Shou Sugiyama, Iruma, Japan

[73] Assignee: TEAC Corporation, Tokyo, Japan

[21] Appl. No.: 910,197

[22] Filed: Jul. 8, 1992

[30] Foreign Application Priority Data

Jul. 11, 1991 [JP] Japan ............................ 3-62103

[51] Int. Cl.⁵ .................................. G11B 11/00
[52] U.S. Cl. ............................ 369/13; 369/59;
369/116; 360/114
[58] Field of Search ................ 369/13, 59, 116;
360/114

[56] References Cited

U.S. PATENT DOCUMENTS 4,665,443 5/1987 Tanaka ........................ 360/74.1
4,843,494 6/1989 Cronin et al. .................. 359/565

OTHER PUBLICATIONS

"Overwriting Technologies of Magneto-optical Disks by Magnetic Field Modulation Method", Television Gakkai Technical Reports published Feb. 1990, pp. 63-70, vol. 14.

*Primary Examiner*—Robert J. Pascal
*Assistant Examiner*—Reginald A. Ratliff
*Attorney, Agent, or Firm*—Woodcock Washburn Kurtz Mackiewicz & Norris

[57] ABSTRACT

A magnetic transducer is provided which has two coils wound in opposite directions on a core. The transducer coils are connected to a direct current power supply via two switches respectively. A write control circuit applies a binary write control signal, representative of digital information to be recorded, to the switches thereby causing the same to be alternately turned on and off. A reactor is connected in series with the power supply, so that each transducer coil is excited not only from the power supply but also from the reactor. An alternate embodiment is disclosed in which the transducer has only one coil connected to a power supply via a bridge circuit of four switching transistors. The transducer coil is alternately excited in opposite directions from a power supply and a reactor connected in series therewith.

2 Claims, 3 Drawing Sheets

LOW VOLTAGE, HIGH CURRENT MAGNETIC TRANSDUCER DRIVE SYSTEM FOR DIGITAL RECORDING

BACKGROUND OF THE INVENTION

This invention relates generally to magnetic recording systems for digital information, and more specifically to such a system capable of driving a magnetic transducer with a current higher than that due only to a power supply of a given voltage, in order to make possible the recording of high frequency digital signals.

Magnetic transducers are inductive, so that they offer high impedances when recording high frequency digital information. Correspondingly high drive voltages are therefore required. It might be contemplated to provide inductance capacitance resonance networks in order to obtain sufficiently high voltages. This solution is unsatisfactory because it would be difficult to maintain LC resonance in cases where the information being recorded varies in a wide range of frequencies.

Another solution is found in an article entitled "Overwriting Technologies of Magneto-optical Disks by Magnetic Field Modulation Method" in pp. 63-70 of the Vol. 14, No. 17, issue of *Television Gakkai Technical Reports* published February 1990 by Television Gakkai of Japan. This article teaches the connection of two inductive reactors between magnetic transducer and power supply. Two switches are alternately turned on and off to cause the transducer to be excited from the power supply via one of the reactors and then the other. Energy is stored on one of the reactors when the transducer is being excited via the other reactor. Accordingly, when the transducer is subsequently excited via said one reactor, the energy that has been stored thereon is also utilized to energize the transducer. A net current flowing through the transducer is therefore of greater magnitude than the current offered solely by the power supply.

This prior art transducer drive system is objectionable for several reasons. First, it requires two reactors, making the system bulky and expensive. Second, constant current flow through the two reactors involves considerable power loss because of their resistivity. Third and finally, as the current flows through each switch after flowing through both reactors, power loss also occurs at the two switches.

SUMMARY OF THE INVENTION

The present invention seeks to make the prior art transducer drive system less bulky, less expensive, and less power consuming.

Briefly, the invention may be summarized as a low voltage, high current digital recording system comprising a magnetic transducer having at least one coil, a source of direct current, and at least two switches connected between the transducer coil and the power source. Also included is a single inductance or reactor connected in series with the power source. A write control circuit is connected to the switches for applying thereto a binary write control signal representative of digital information to be recorded, in order to cause the switches to be alternately turned on and off, with the consequent excitation of the transducer coil from both the power source and the inductance.

In one preferred embodiment of the invention, the transducer has two coils wound in opposite directions on a magnetic core. The two transducer coils are alternately excited from both the power supply and the reactor as two switches are alternately turned on and off by the binary write control signal. Another preferred embodiment has but one transducer coil connected to the power supply via a bridge circuit of four switching transistors. The bridge circuit responds to the write control signal by causing the single transducer coil to be alternately excited in opposite directions from both the power supply and the reactor.

Thus, in both embodiments disclosed, only one reactor, instead of two in the prior art, is needed for driving the transducer with a current much greater than that due only to the power supply. The improved digital recording system according to the invention is therefore far simpler, less bulky and less expensive than the prior art system.

The above and other features and advantages of this invention and the manner of realizing them will become more apparent, and the invention itself will best be understood, from a study of the following description and appended claims, with reference had to the attached drawings showing the closest prior art and the preferred embodiments of the invention.

DETAILED DESCRIPTION

Figure 1:
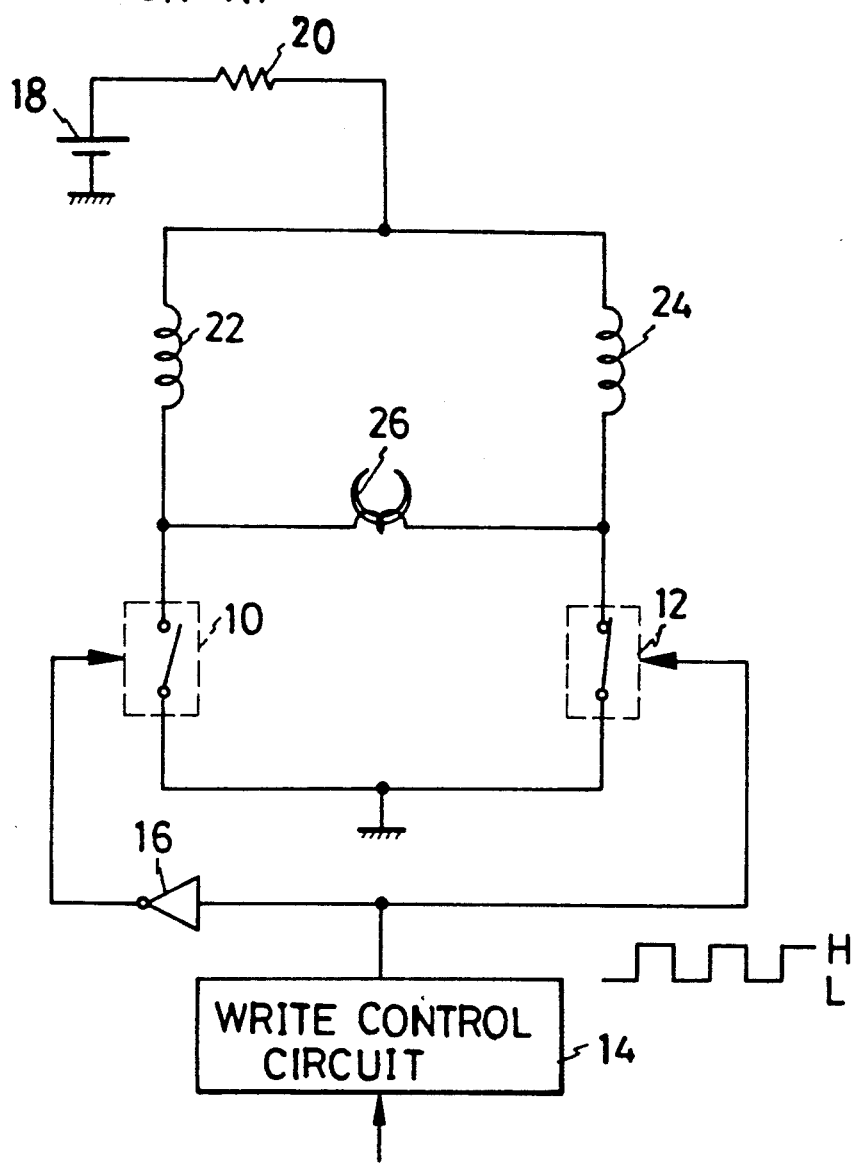
FIG. 1 is a schematic electrical diagram of the prior art digital recording system.

It is considered essential that the noted prior art closest to the present invention be shown and described in more detail, the better to make clear the features and advantages of the invention. With reference therefore to FIG. 1 the prior art transducer drive circuit has two switches 10 and 12 to be alternately turned on and off by the coaction of a write control circuit 14 and a NOT circuit 16. The write control circuit 14 puts out a binary write control signal in response to digital information to be recorded.

When the first switch 10 is closed, a direct current from its source 18 flows through the circuit comprising a resistor 20 and a first reactor 22, with the consequent storage of energy in the first reactor. At the same time, the current flows through the circuit comprising the resistor 20, a second reactor 24, a magnetic transducer 26 and the first switch 10. The transducer 26 is therefore driven from both power supply 18 and second reactor 24 because the second reactor has had energy stored thereon during the previous closure of the second switch 12. The transducer 26 can thus be energized with a current of greater magnitude than if it were excited only from the power supply 18.

When the second switch 12 is closed, on the other hand, the current flows from the power supply 18 through the circuit comprising the resistor 20, first reactor 22, transducer 26 and second switch 12. The transducer 26 is then driven not only from the power supply but also from the first reactor 22, the latter having had the energy stored previously thereon. Energy is stored at the same time on the second reactor 24 as the current flows also therethrough upon closure of the second switch 12.

This prior art transducer drive system possesses the disadvantages pointed out earlier in this specification. The present invention provides an improved digital recording system which defeats all such disadvantages, as disclosed in detail hereafter.

Figure 2:
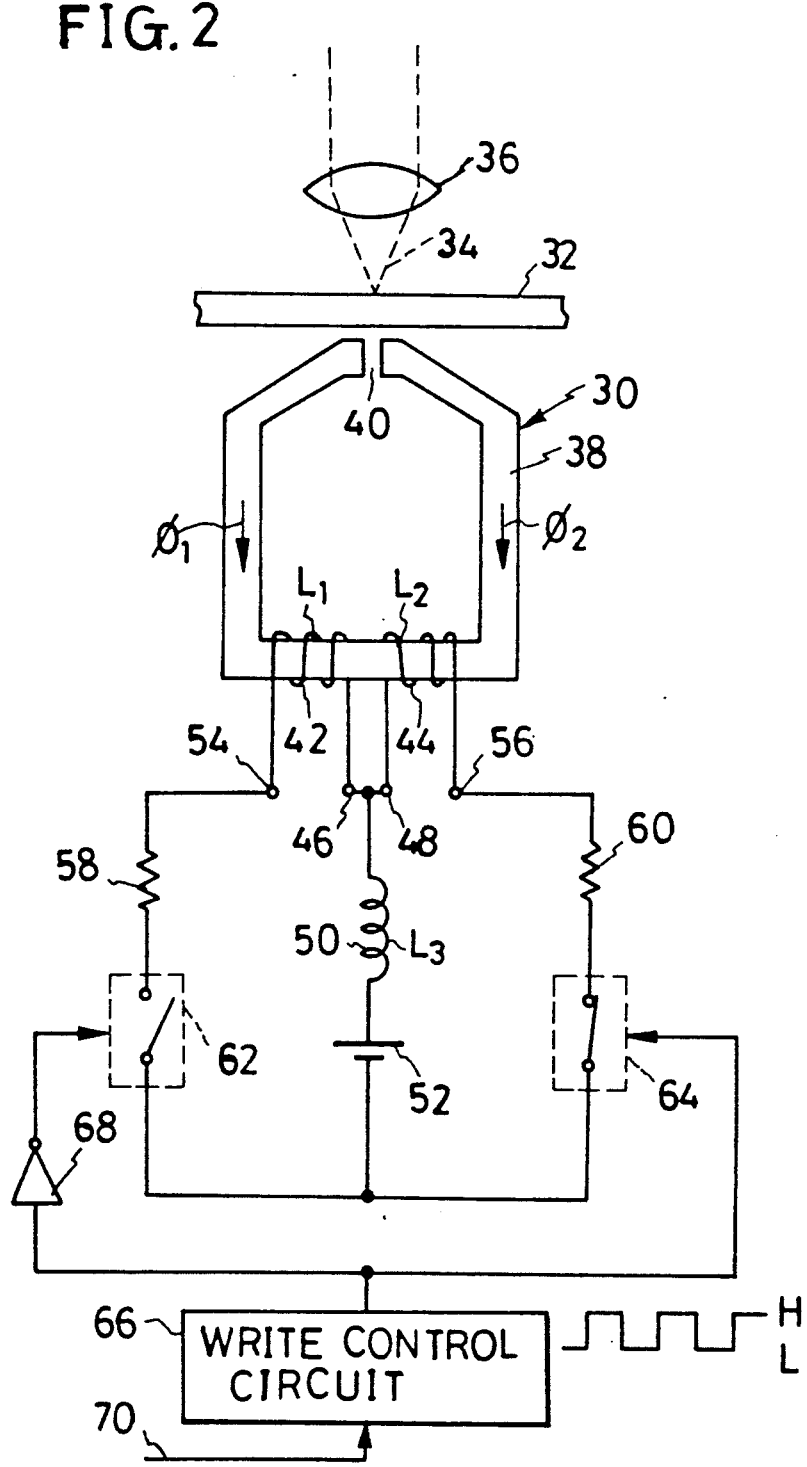
FIG. 2 is a schematic electrical diagram of the improved digital recording system in accordance with the invention.

FIG. 2 shows the improved digital recording system of this invention as incorporated in a data storage apparatus having an electromagnetic transducer 30 for writing digital information on a rotating magnetic disk 32 by magnetic field modulation. The data storage apparatus is shown to employ a beam of light 34 for heating the rotating magnetic disk 32 as the transducer 30 writes thereon. An objective lens 36 focuses the light beam 34 on the disk 32 at the spot where information is written.

The transducer 30 comprises a magnetic core 38 having a write gap 40, and a first 42 and a second 44 coil wound on the core. Both coils 42 and 44 have the same number of turns but are wound in different directions. Therefore, when energized, the coils 42 and 44 create magnetic fluxes $\phi_1$ and $\phi_2$, respectively, which are oriented in opposite directions.

The transducer coils 42 and 44 have each one extremity 46 or 48 connected to a common reactor 50 and thence to one terminal of a direct current power supply 52. It is understood that the inductance $L_3$ of the reactor 50 is higher than the inductances $L_1$ and $L_2$ of the transducer coils 42 and 44. The other extremities 54 and 56 of the transducer coils 42 and 44 are connected to the other terminal of the power supply 52 via two resistors 58 and 60 and two switches 62 and 64, respectively. Preferably, the switches 62 and 64 may take the form of transistors in practice.

As in the prior art system of FIG. 1, the two switches 62 and 64 are to be alternately turned on and off by switch control means comprising a write control circuit 66 and an inverter 68. The write control circuit 66 puts out a binary write control signal representative of a digital write signal supplied over an input line 70. The write control signal is applied to the first switch 62 via the inverter 68 and directly to the second switch 64.

Operation

The first switch 62 is on, and the second switch 64 off, when the binary write control signal from the write control circuit 66 is low. The result is the formation of a closed circuit comprising the power supply 52, reactor 50, first transducer coil 42, first resistor 58, and first switch 62.

It is understood that the reactor 50 has energy stored thereon during the previous closure of the second switch 64. Thus, as the first transducer coil 42 is driven from both power supply 52 and reactor 50, a large current will quickly flow therethrough with the consequent creation of the magnetic flux $\phi_1$ in the magnetic core 38 and hence the magnetization of the disk 32 in a first direction.

The first switch 62 is off, and the second switch 64 on, when the write control signal from the write control circuit 66 is high. Another closed circuit is then completed which comprises the power supply 52, reactor 50, second transducer coil 44, second resistor 60, and second switch 64.

At this time, too, the second transducer coil 44 is driven not only from the power supply 52 but also from the reactor 50, the latter having had energy stored thereon during the previous closure of the first switch 62. An equally large current will therefore quickly flow through the second transducer coil 44, resulting in the creation of the magnetic flux $\phi_2$ in the magnetic core 38 and therefore the magnetization of the disk 32 in a second direction opposite to the first direction.

As is clear from the foregoing, the two transducer coils 42 and 44 are alternately driven with a current much larger than that due only to the power supply 52. This objective is accomplished according to the invention by connecting but one reactor 50 in series with the power supply 52. Both transducer coils 42 and 44 share the reactor 50. The FIG. 2 circuitry according to the invention is therefore far less bulky and far less expensive than the prior art circuitry of FIG. 1.

It will also be appreciated that the current that has flowed through only one of the transducer coils 42 and 44 flows through each of the switches 62 and 64. Consequently, power losses at these switches are materially less than those at the corresponding switches 10 and 12 of the prior art.

Second Form

Figure 3:
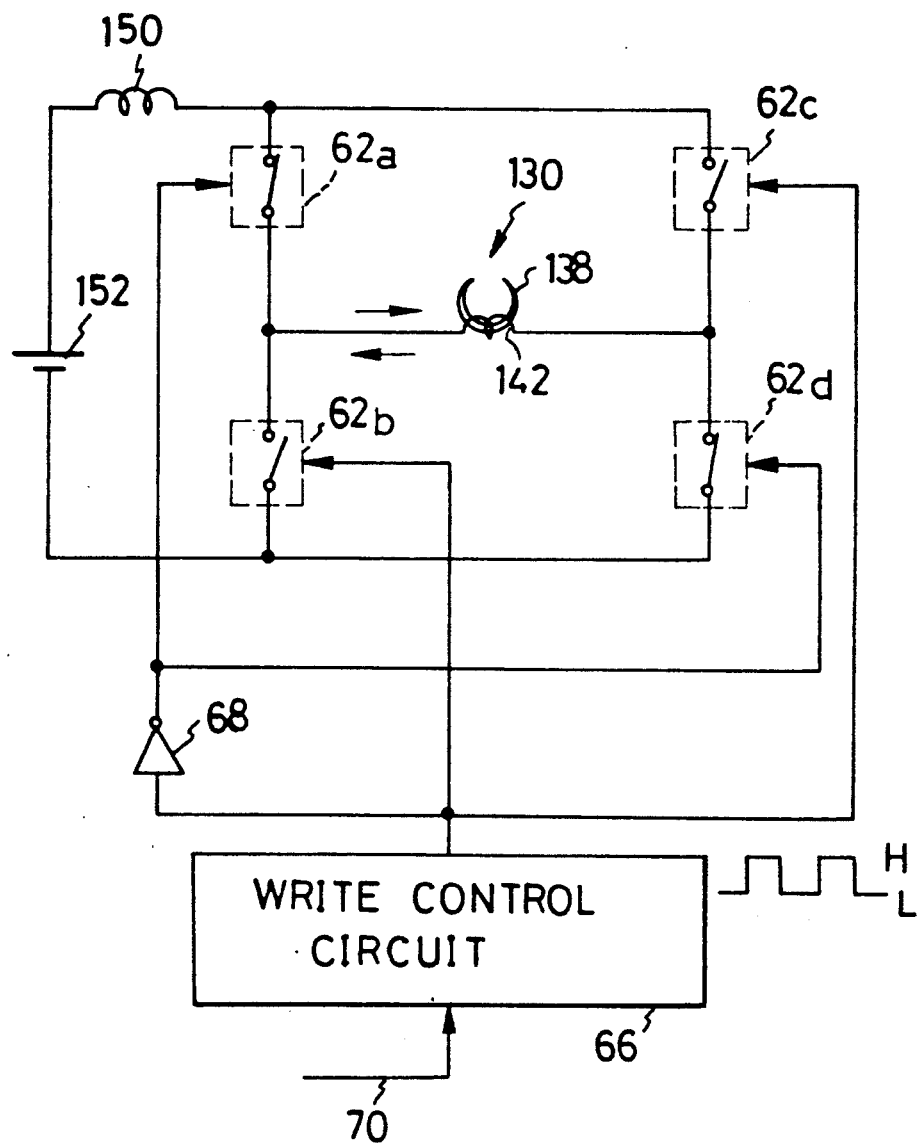
FIG. 3 is a schematic electrical diagram of another preferred form of digital recording system in accordance with the invention.

In another preferred embodiment of the invention shown in FIG. 3, a magnetic transducer 130 has but one coil 142 wound on a core 138. This transducer is connected to a power supply 152 via a bridge circuit of four switches such as transistors 62a, 62b, 62c and 62d. This second embodiment also differs from the first disclosed embodiment in having a single reactor 150 connected in series with the power supply 152. The inductance of the reactor 150 must be sufficiently larger than that of the transducer coil 142.

The four switches 62a–62d are turned on and off by the combination of the write control circuit 66 and the inverter 68. The write control circuit 66 is connected directly to the second 62b and third 62c switches and, via the inverter 68, to the first 62a and fourth 62d switches.

Operation of Second Form

The first 62a and fourth 62d switches are on, and the second 62b and third 62c switches off, when the binary write control signal from the write control circuit 66 is low. A closed circuit is then completed which comprises the power supply 152, reactor 150, first switch 62a, transducer coil 142 and fourth switch 62d. As the transducer coil 142 is thus energized in one direction from both power supply 152 and reactor 150, the magnetic disk will be magnetized in a first direction.

The second 62b and third 62c switches are on, and the first 62a and fourth 62d switches off, when the write control signal from the write control circuit 66 is high. Another closed circuit is then completed which comprises the power supply 152, reactor 150, third switch 62c, transducer coil 142 and second switch 62b. The transducer coil 142 is therefore energized in the other direction from both power supply 152 and reactor 150, causing the magnetic disk to be magnetized in a second direction opposite to the first direction.

It is therefore apparent that this second embodiment gains the same advantages as the first.

Possible Modifications

Although the present invention has been shown and described in the foregoing in very specific aspects thereof, it is not desired that the invention be limited by the exact details of such disclosure. The following, then, is a brief list of possible modifications, alterations and adaptations of the illustrated embodiment which are all believed to fall within the scope of this invention:

1. The inverter 68 of the FIG. 2 circuitry could be omitted by employing transistors of different conductivity types as the switches 62 and 64.

2. The inverter 68 of the FIG. 3 circuitry could also be omitted by employing transistors of one conductivity type as the first 62a and third 62c switches, and those of another conductivity type as the second 62b and fourth 62d switches.

3. Write control signals could be so formed as to prevent the exactly simultaneous conduction of the switches in the FIG. 3 circuitry.

4. The use of a light beam is not essential.

What is claimed is:

1. A low voltage, high current digital recording system comprising:
   - (a) a magnetic transducer having a magnetic core and a first and second coil would in opposite directions on the core;
   - (b) a power source of direct current;
   - (c) a first switch connected between the first transducer coil and the power source;
   - (d) a second switch connected between the second transducer coil and the power source
   - (e) a single inductance connected in series with the power source and the first and the second transducer coils; and
   - (f) a write control circuit connected to the first and the second switches for applying thereto a binary write control signal representative of digital information to be recorded, in order to cause the switches to be alternately turned on and off, with the consequent alternate excitation of the first and the second transducer coils from both the power source and the inductance.

2. A low voltage, high current digital recording system comprising:
   - (a) a magnetic transducer having a coil;
   - (b) a power source of direct current;
   - (c) a switching circuit connected between the transducer coil and the power source for causing the transducer coil to be excited from the power source in either of two opposite directions, the switching circuit being a bridge circuit of four switching elements;
   - (d) a single inductance connected in series with the power source and between the power source and the switching circuit; and
   - (e) a write control circuit connected to the switching circuit for applying thereto a binary write control signal representative of digital information to be recorded, in order to cause the transducer coil to be alternately excited in the opposite directions from both the power source and the inductance.

* * * * *